Figure 1:
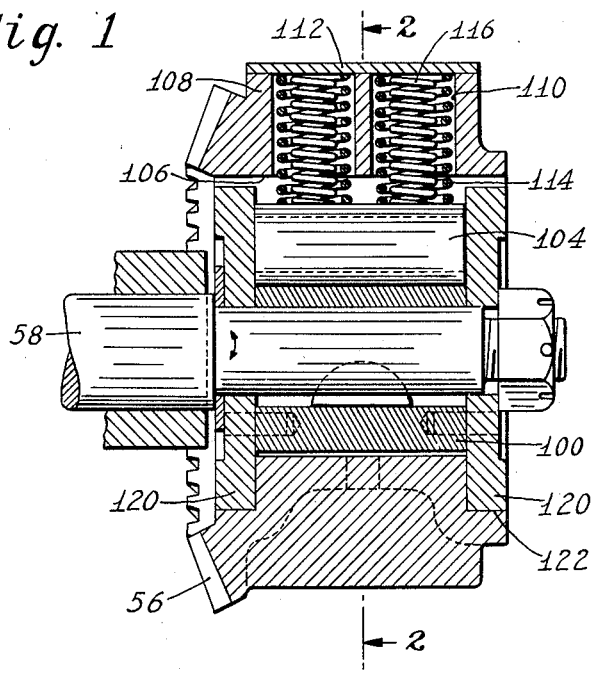

Feb. 7, 1939.  M. I. MATHEWSON  2,146,153
DRIVING CONNECTION FOR USE IN MACHINE TOOLS
Filed Nov. 23, 1934  2 Sheets-Sheet 1

Witness
Chas. T. Olson

Inventor
Maxwell I. Mathewson
by Fish Hildreth
Cary & Jenney Attys.

Feb. 7, 1939.  M. I. MATHEWSON  2,146,153
DRIVING CONNECTION FOR USE IN MACHINE TOOLS
Filed Nov. 23, 1934   2 Sheets-Sheet 2
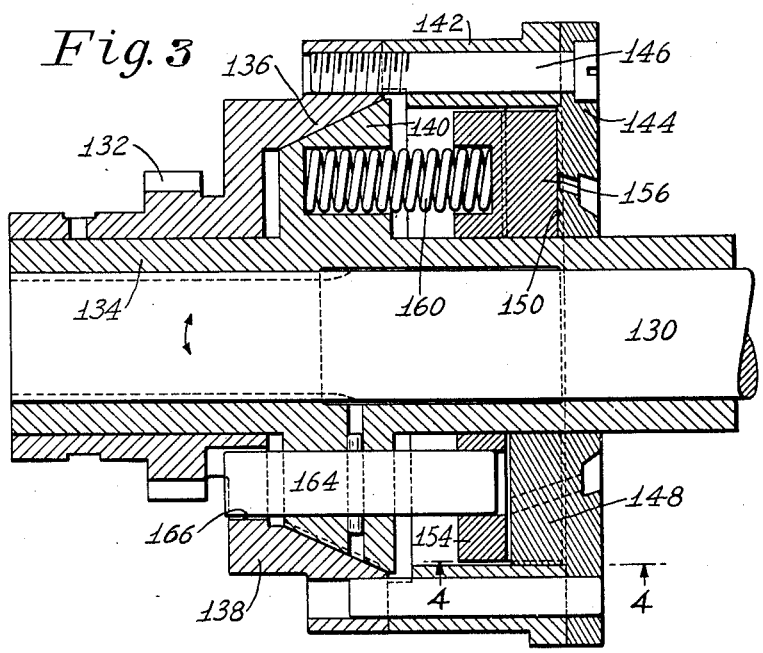
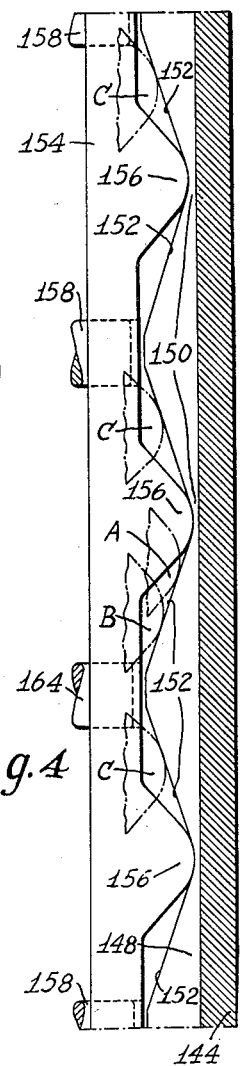
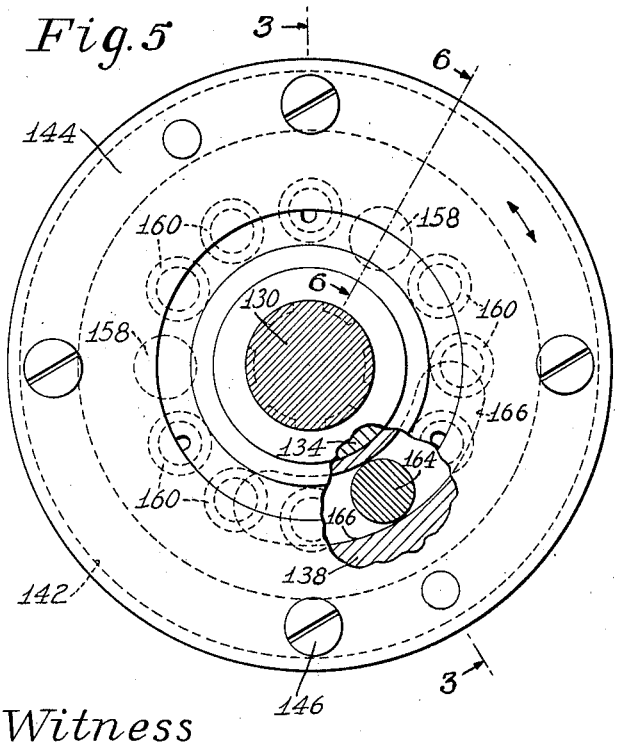
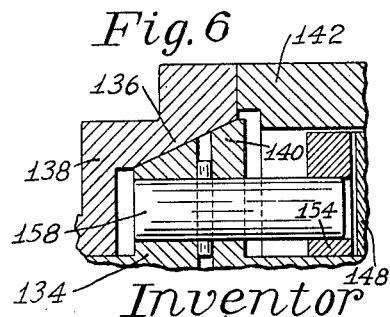
Witness
Chas. T. Olson
Inventor
Maxwell I. Mathewson
by Crick Hildreth
Cary & Jenney attys.

Patented Feb. 7, 1939

2,146,153

UNITED STATES PATENT OFFICE 2,146,153

DRIVING CONNECTION FOR USE IN MACHINE TOOLS

Maxwell I. Mathewson, Providence, R. I., assignor to Brown and Sharpe Manufacturing Company, a corporation of Rhode Island Application November 23, 1934, Serial No. 754,435

17 Claims. (Cl. 64—27)

The present invention relates to improvements in driving mechanism for a machine tool having relatively heavy reciprocable parts, and more particularly to a driving device adapted for driving and reversing the work table of a machine such as a grinding machine or planer.

In machines of this type which are provided with mechanical driving connections including a reversing clutch of some description designed to secure an accurate and substantially instantaneous reversal of the table, considerable difficulty has been experienced in developing a shock absorber device which will absorb in a satisfactory manner the heavy strains thrown on the parts of the machine, and more particularly on the driving connection, by the shifting of the reversing clutch or by suddenly increased resistance to the movement of the table during the drive in either direction. Previous attempts have been made to solve this problem, usually by means of springs which, however, have certain serious disadvantages which have operated heretofore as a limiting factor in determining the maximum speed for a satisfactory operation of these machines to avoid excessive shock upon reversal, and also to secure an even accurate drive of the table in each direction. Where it has been proposed to take up the shock of reversal by loading a heavy spring, it has been found impossible satisfactorily to avoid the effects of a correspondingly heavy recoil in the opposite direction, whether this is employed to impart an impetus directly to the movement of the table in the reverse direction or is merely allowed to dissipate itself by disconnecting the spring. The use of a spring cushion to take up any excessively heavy shocks due to interference between the tool and work during travel in either direction, has been found to have the serious disadvantage of producing a jerky, uneven feed of the work support with consequent loss of quality in the finished product.

The object of the present invention is to provide in a machine of this description, a yielding driving connection of improved construction and mode of operation, and with these objects in view, a feature of the invention contemplates the provision of relatively movable driving and driven members which are connected through a yielding resistance to absorb excessively heavy shocks to the drive, and in which each additional increment of movement between these members operates to increase the resistance to the relative movement of these elements in either direction.

More specifically, the invention contemplates the provision of a novel and improved frictional driving connection in the driving train comprising frictionally engaging driving and driven elements which are arranged at all times to provide a frictional resistance to a relative movement of said elements in both directions, and are further arranged so that each additional increment of relative movement of said elements from a central key position in either direction will cause the amount of friction to be progressively increased until the amount of pressure between the elements is sufficient to secure a stationary driving relation therebetween.

A feature of the present invention also consists in a frictional driving connection comprising two frictionally engaging members together with spring means for regulating the amount of the frictional pressure between the engaging surfaces and cam devices controlled by the relative movement of the two elements for controlling the operation of the spring to progressively increase the frictional pressure exerted thereby for each additional increment of relative movement of the two elements away from a central neutral or key position.

Figure 2:
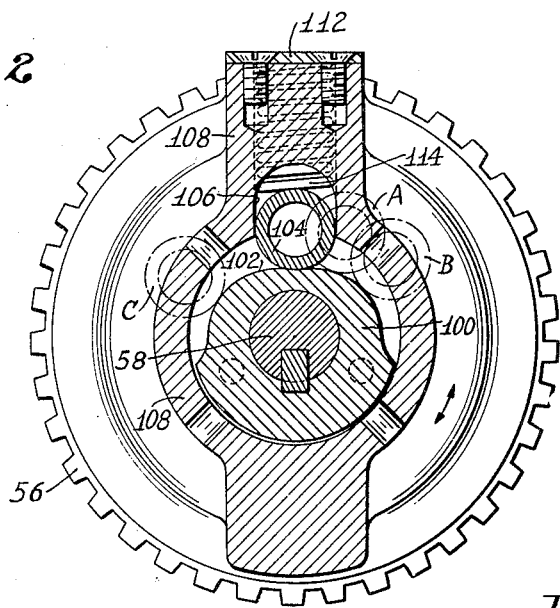

The several features of the invention consist also in the devices, combinations and arrangement of parts hereinafter described, which together with the advantages to be obtained thereby will be readily understood by one skilled in the art from the following description taken in connection with the accompanying drawings, in which Fig. 1 is a detail sectional view in side elevation illustrating one form of applicant's improved driving connection for driving a reciprocable support from a reversible driving member Fig. 2 is a detail sectional view taken on the line 2—2 of Fig. 1; and Figs. 3 to 6 inclusive illustrate another embodiment of the present invention in a somewhat different form, Fig. 3 being a sectional view taken on the line 3—3 of Fig. 5 and illustrating particularly the drive shaft, a gear mounted concentrically therewith, and mechanism for providing a frictional driving engagement therebetween, Fig. 4 being a developed view taken on the line 4—4 of Fig. 3, of the cam and follower elements for controlling the application of frictional pressure to secure a frictional driving relation between the driving and driven elements, Fig. 5 being an end view of the parts shown in Fig. 3 looking from the right, and with a portion of the end plate broken away to illustrate particularly the pin and slot connection between the driving and driven elements, and Fig. 6 being a detail sectional view taken on the line 6—6 of Fig. 5.

As shown in the drawings, applicant's improved driving connection is interposed between and forms a yieldable connection between a bevel gear 56 and a rotatable shaft 58 which comprise respectively the driving and driven elements in a reversible gear train for a machine tool support. For purposes of illustration, it may be assumed that the bevel gear 56 is driven through power connections including a reversing clutch which may be of ordinary description, and that the shaft 58 is positively connected through appropriate gearing to drive the work table of a grinding machine which may be of ordinary description.

In order to take up the shock of reversal of the table drive when the reversing clutch is shifted from one driving position to the other to reverse the direction of rotation of the shaft 58, and also to provide a yielding element in the driving connections for relieving the shock of greatly increased resistance to the movement of the table in either direction through interference between the work and the operating tool, a frictional driving connection is provided between the bevel gear 56 and the driven shaft 58 which is arranged under normal operating conditions to provide a positive drive to the table, but is permitted when subjected to relatively heavy shocks either upon reversal or during the operation in either direction, to provide a sufficient amount of yield, to fully absorb these shocks, and thus to permit an even and substantially continuous drive to be imparted to the table to insure a high quality of operation of the machine for greatly increased speeds of table travel. This mechanism, as best shown in Figs. 1 and 2, comprises a sleeve member 100, which is rigidly keyed to the driven shaft 58 and is cut away along one side of its periphery, as best illustrated in cross section in Fig. 2, to provide a cam-shaped contour 102 having a central low point corresponding to the uppermost part for the angular position illustrated in Fig. 2, and a gradual rise on either side thereof extending around the periphery of the sleeve 100. Co-operating therewith is a cylindrical cam roll 104, which is supported in a groove 106 in a casing 108 forming an integral part of the hub of the gear 56, and which is pressed yieldingly into frictional engagement with the cam surface 102 of the sleeve 100 by two sets of coil springs mounted within a recess 100 formed in the casing 108 and seated against a cover plate 112 secured to the casing 108. Each of these sets of springs comprises two coil springs 114 and 116, one mounted within the other, which engages at one end against the cover plate 112 and at the other end against the cylindrical friction roll 104. In order to increase the amount of the frictional resistance between the driving gear 56 and the driven shaft 58, there is secured to each end of the sleeve member 100, a friction disk 120 having a concentric peripheral surface which is arranged to engage within a corresponding annular recess 122 formed in the casing hub 108 of the gear 56. The friction disks 120 serve as bearing supports for the gear 56 and casing hub 108 on the drive shaft 58. A further element of resistance to the movement of the roll 104 with relation to the cam surface 102 in either direction from the hypothetical neutral position shown in Fig. 2, is provided by the fact that the roll 104 is moved against an inclined surface of the cam 102. Conversely, during a return movement of the roll 104 on the cam surface 102 toward the hypothetical neutral position shown in Fig. 2, the resistance to the relative movement of these parts is to some extent diminished due to the fact that the roll 104 is moving down the inclined surface of the cam 102. At this point it may be noted that the angle of rise of the cam surface 102 in each direction from the central low point with relation to the axis of rotation of the cam shaft 58 is adjusted to provide a rapid increase in the frictional resistance to the relative movement of the gear 56 and shaft 58 in each direction, but is still sufficiently small to substantially absorb the radially directed pressure of the springs 114 and 116, so that the gear 56 and shaft 58 will be held in a relatively stationary position regardless of the position of the roll 104 on the cam surface 102 through the frictional resistance provided by the engagement of the roll 104 and disks 120 with their cooperating friction surfaces. With this arrangement and construction of the parts, the increase in pressure applied by the springs 114 and 116 as the cam roll 104 rides onto a high portion of the cam 102, acts merely to increase the frictional resistance to relative movement in either direction of the frictionally engaging elements associated with the gear 56 and shaft 58 to maintain these parts in a stationary relative position.

The operation of the yielding friction driving connection above set forth, may be described as follows:—Starting from a hypothetical neutral position shown in Fig. 2, it is assumed that the power driving connections are rendered operative to rotate the gear 56 in one direction. The frictional engagement of the cylindrical roll 104 with the cam surface 102 of the sleeve 100 and of the peripheral portions of the disks 120 with the bottom portions of the annular recesses 122, tends to cause the shaft 58 to rotate with the gear 56 to impart a drive to the table. The inertia of the relatively heavy table and work supported thereon, however, tends strongly to resist any rotational movement of the shaft 58, so that the friction roll 104 is caused to move relatively to the sleeve 100 against the force of its frictional contact with the cam surface 102. As the friction roll 104 rides upwardly on the cam surface 102, the movement of the friction roll 104 into its groove 106, causes the springs 114 and 116 to be compressed, greatly increasing the amount of the friction between the roll 104 and the sleeve 100, and between the friction disks 120 and recesses 122, to produce a stationary driving relationship between these parts. The friction roll may be assumed at this point to have moved to a position with relation to the cam surface 102 which is indicated approximately in dotted lines at A in Fig. 2. If at any point during the traverse of the table, greatly increased resistance is encountered due to the engagement of the grinding wheel with an uneven surface of the work, the consequent shock to the driving connections may cause the friction roll 104 to be moved still further up on the cam surface 102, further compressing the springs 114 and 116, and again increasing the frictional pressure between the roll 104 and the sleeve 100, so that another stationary driving relationship is arrived at and maintained between the gear 56 and shaft 58. The position of the friction roll 104 with relation to the cam surface 102 at this point may be assumed to be the dotted line position B shown in Fig. 2.

If now at the end of the movement of the table in one direction, the driving gear 56 is reversed, as for instance, by the operation of a conventional reversing clutch it may be assumed that the gear 56 is immediately stopped and immediately started rotating at full speed in the opposite direction. The weight of the driven elements which may be assumed to include the work table and work supported thereon tends to produce a very heavy strain on the driving connections upon stopping and reversing the direction of table travel, particularly where the reciprocation takes place at relatively high speeds. The twisting strain on the driving connections set up upon reversal of drive due to the inertia of the table and work, causes the friction roll 104 to be moved back towards the center position shown in Fig. 2, riding down the surface of the cam 102. This movement due to the relatively small angle of the cam 102, is opposed by the frictional resistance existing between the friction roll 104 and the cam friction surface 102, and also by the friction disks 120. The amount of this friction, however, is substantially decreased as the friction roll 104 rides onto the low portion of the cammed friction surface 102 by the elongating and consequent reduction in pressure exerted by the springs 114 and 116. The amount of the frictional resistance as determined by the pressure of the springs 114 and 116 against the area of frictional contact between the roll 104 and the cam 102, and also between the flanges 120 and annular groove 122 above described, is calculated so that the roll 104 will move beyond the central low position, and will again ride onto the rise on the cam 102 on the opposite side of the central low point, thus causing the springs 114 and 116 to be compressed, and increasing the frictional resistance to the relative movement of the shaft 58 to the gear 56 until the stable driving relation is again obtained between the parts. The position of the friction roll 104 with relation to the cam 102 at this time is generally indicated by the dotted line position C illustrated in Fig. 2.

In order to provide a sufficient amount of frictional resistance to the relative movement of the elements of a yielding friction driving connection for heavier and more powerful machines than that above described, an alternative construction has been devised as illustrated in Figs. 3 to 6 inclusive. This construction comprises a driving element in the form of a drive shaft 130, and a driven element in the form of a gear 132 which is loosely mounted on a bushing 134 rigidly keyed to the shaft 130. A frictional driving engagement is obtained between the shaft 130 and gear 132 through the engagement of two concentric friction surfaces in the form of a friction cone clutch comprising a conical clutch member 136 formed on the flanged hub 138 of the sleeve gear 132, and a corresponding conical clutch member 140 formed integrally with the bushing 134 on the shaft 130.

In accordance with the present invention, mechanism is provided for maintaining the two members 136 and 140 of the conical friction clutch in frictional engagement. This mechanism is further arranged so that a relative rotational movement between the gear 132 and shaft 130 in either direction from a central key position will cause frictional pressure between the clutch members to be increased until a stable driving relationship is obtained, and upon reversal in the direction of drive first to decrease the amount of frictional pressure exerted, and thereafter again to increase the frictional pressure so that a cushioned reversing movement is obtained through a limited rotational movement of the gear 132 with relation to the shaft 130 which is checked by steadily increasing the engaging pressure between the two parts of the clutch with an accompanying increase in the frictional resistance to the relative movement of the elements. This mechanism comprises a cylindrical cage or bracket comprising a cylindrical member 142 and an end plate 144 which are rigidly secured to each other and to the flange portion 138 of the gear 132 by means of screw bolts 146. There is formed on the inner face of the end plate 144, a cam ring 148 cammed to provide three low points 150, and on each side thereof a gradual rise 152. Cooperating therewith is a ring 154 which is provided with three projecting portions 156 which are spaced as best shown in the developed view Fig. 4 to correspond exactly to the low points 150 on the cam ring 148. The follower ring 154 is maintained in a constant angular relationship to the bushing 134, and is permitted to slide axially thereof by means of two pins 158 which extend parallel to the axis of the shaft 130, being rigidly secured to the clutch member 140 and arranged to fit into corresponding holes formed in the ring 154. There are also provided a number of coiled compression springs 160, each of which is seated at opposite ends in corresponding recesses formed in the clutch member 140 and in the follower ring 154, so that the follower ring 154 is at all times forced into engagement with the cam ring 148 on the end plate 144, tending to move the end plate 144, clutch member 136 and gear 132 secured thereto to the right as shown in Fig. 3, to maintain an engaging frictional pressure at all times between the clutch members 136 and 140. The movement of the gear 132 and associated parts, including the cam ring 148, with relation to the driving shaft 130 and clutch member 140 secured thereto, is positively limited by means of a pin 164 which is mounted in the clutch member 140 parallel to the axis of rotation of the shaft 130, and at one end is fitted into one of the holes in the follower ring 154, and at its other end extends into a slot 166 formed in the flanged portion 138 of the gear 132.

The operation of the frictional driving connection to absorb the shock of starting, stopping and reversing a driving train for reciprocating a heavy support, as for instance, the work supporting table of the grinding machine above described, and to provide a stable driving relation between these elements during the drive in either direction which is also capable of absorbing further shocks due to increased resistance to the movement of the support, may be described as follows:

Starting from a hypothetical neutral or key position illustrated by the position of the parts illustrated by the relative position of the cam ring 148, gear 132 and associated parts with relation to the follower ring 154 and shaft 130 and associated parts, the rotation of the drive shaft 130 in either direction will act through the frictional engagement of the clutch members 140 and 136 to impart a similar rotational movement to the gear 132. Assuming that the gear 132 is connected to drive a relatively heavy reciprocable member so that a considerable amount of resistance is encountered to the initial rotation of the gear 132, the clutch member 136 will tend to slip with relation to the clutch member 140, so that a relative movement of the gear 132 and shaft 130 takes place, causing the follower members 156 of the follower ring 154 to ride up the adjacent side portions of the cam 152 from the position shown in Fig. 4. This movement of the follower ring 154 causes the ring to be moved to the left as shown in Figs. 3 and 4, to compress the springs 160, so that a steadily increasing frictional pressure is built up between the clutch members 140 and 136 to arrest further relative rotational movement between these parts in both directions. A stable driving relationship is thus secured between the gear 132 and shaft 130. The relative position of the parts is indicated by the dotted line position A of the follower members 156 with relation to the cam surface 152 of the cam ring 148. Should any greatly increased resistance be suddenly offered to the continued movement of the table or similar part driven by the gear 132, a further yield may take place between the clutch members 136 and 140, thus causing the follower members 156 of the follower ring 154 to ride still further up on the rise of the cam 152 to some position which may be generally indicated by the dotted line position shown at B in Fig. 4.

If it is now desired to suddenly reverse the direction of rotation of the shaft 130 at the end of the movement of the driven support in one direction, the inertia of the parts driven by the gear 132 will be sufficient to cause a relative turning movement of the gear 132 with relation to the shaft 130 which will cause the follower portions 156 on the follower ring 154 to ride down the cammed surfaces 152 of the cam ring 148 to the neutral position illustrated in Fig. 4, and thereafter to rise on the opposite sides of their respective cams. It will readily be seen that the movement of the cam follower 156 to the low portion 150 of the cam 152 will operate to relieve the pressure on the springs 160, and will thus considerably lessen the frictional tension exerted thereby to maintain the clutch members 136 and 140 in operating frictional engagement. The reduction in the frictional engaging pressure between the elements of the cone clutch exerted by the springs 160 is sufficient to permit a relative movement of the gear 132 and clutch member 138 with relation to the shaft 130 and clutch member 140 to carry the follower members 156 past the low portions 150 of the cam 152 onto the opposite rise. The consequent compression of the springs 160 and increase in the frictional resistance to continued relative movement of the clutch members 136 and 140 will cause a stable driving relationship to be arrived at between the gear 132 and shaft 130 which will correspond to a dotted line position of the follower portions 156 of the follower ring 154 roughly indicated in dotted lines in Fig. 4 as position C. The rotational movement of the gear 132 with relation to the drive shaft 130 in either direction is positively limited by the engagement of the pin 164 with one end or the other of the slot 166, so that the follower portions 156 of the ring 154 must at all times operate with relation to the same low portion and adjacent rising portions of the cam 152. The weights of the springs 160 are calculated with relation to the area of the friction bearing surface of the conical clutch members 136 and 140 in accordance with the mass and inertia of the parts driven by the gear 132, so that a stable driving relation will be established between the gear 132 and shaft 130 before the follower portion 156 will have reached the tops of the rises, and before the pin 164 is brought into engagement with the end of the slot 166, so that it will be possible in case of suddenly increased resistance to the drive of the table in either direction to secure a further yield in the driving connection to absorb the shock of the increased load on the driving train.

The invention having been described, what is claimed is:

1. In a device of the character described, a yielding driving connection comprising driving and driven friction elements, said elements having opposed frictionally engaging surfaces arranged to resist relative movement of said elements in both directions, means for maintaining an engaging pressure between said surfaces, and a device acting on said pressure means for varying the engaging pressure between said friction surfaces including a follower on one of said elements and a cam on the other of said elements, said cam having oppositely inclined rise portions cammed at a sufficiently small angle to prevent relative movement between said friction elements due to the engaging pressure between the cam and follower, and spaced on opposite sides of said follower to be rendered operative by relative movement of the friction elements in either direction from an intermediate position for engagement with said follower to provide an increasing frictional resistance sufficient to gradually stop relative movement of said elements.

2. A connection for driving a reciprocable support from a reversible driving member comprising driving and driven friction elements rotatable relatively on a single axis, one of said elements having formed on the periphery thereof a friction surface cammed outwardly from each side of a central position at an angle, the other of said elements having thereon a cooperating radially movable friction member arranged for frictional engagement with said cammed friction surface, and spring means acting on said radially movable friction member to maintain a frictional pressure between said friction member and surface arranged upon movement of said friction member outwardly on said cammed surface to increase the frictional pressure against relative movement of said driving and driven elements in each direction, the angle of said cam being such as to prevent rotational movement of said cammed friction element under the force of the spring.

3. A connection for driving a reciprocable support from a reversible driving member comprising driving and driven friction elements rotatable relatively on a single axis, said elements having radially opposed cylindrical friction bearing surfaces arranged to resist relative movement of said elements in both directions, spring means acting radially to maintain an engagement under pressure of said friction surfaces, and a cam and follower connection acting on said spring means to vary the pressure exerted thereby comprising a radially movable follower on one of said elements and a cam on the other of said elements having a central low point and oppositely inclined rise portions of sufficiently small slope to prevent relative movement between said frictional members due to the engaging pressure between said cam and follower elements, the movement of the follower down one of said rise portions during relative movement of said friction elements being arranged to reduce the frictional pressure maintained by the spring, and the upward movement of the follower on the other of said rise portions being arranged to compress the spring and thereby to provide a steadily increasing frictional pressure between said friction surfaces to reestablish a stable driving relationship between said elements.

4. A connection for driving the reciprocable support from the reversible driving member comprising driving and driven friction elements rotatable relatively on a single axis, one of said elements comprising a friction cylinder having formed thereon a peripheral friction surface cammed outwardly in each direction from a central low point at an angle, and a friction disk secured to each end thereof, the other of said elements comprising a support having friction surfaces cooperating with said friction disks, a friction roll mounted for movement radially in said support to frictionally engage the cammed friction surface of said cylinder, and a compression spring acting radially between said support and friction roll to maintain an engaging frictional pressure between said opposed friction surfaces, the angle of said cam being such as to prevent rotational movement of the cylinder under the force of the spring.

5. A connection for driving a reciprocable work support from a reversible driving member comprising driving and driven elements supported to turn on a single axis, said members having axially opposed friction surfaces arranged to resist relative movements of said elements in both directions, spring means for exerting an axially directed engaging pressure between said surfaces, and a cam and follower connection acting on said spring means to vary the pressure exerted thereby comprising a follower on one of said elements and a cam on the other of said elements having a central low point and oppositely inclined rise portions of sufficiently small slope to prevent relative movement between said frictional members due to the engaging pressure between said cam and follower elements, the movement of the follower down one of said rise portions during relative movement of the driving and driven elements being arranged to reduce the frictional pressure maintained by said spring means, and the upward movement of the follower on the other of said rise portions being arranged to compress the spring and thereby to steadily increase the frictional pressure between said friction surfaces against relative movement thereof in both directions.

6. A connection for driving a reciprocable work support from a reversible driving member comprising driving and driven elements supported to turn on a single axis, said members having axially opposed cone-shaped friction surfaces arranged to resist relative movement of said elements in both directions, spring means for exerting an axially directed engaging pressure between said surfaces, and a cam and follower connection acting on said spring means to vary the pressure exerted thereby comprising a follower on one of said elements and a cam on the other of said elements having a central low point and oppositely inclined rise portions of sufficiently small slope to prevent relative movement between said friction members due to the engaging pressure between said cam and follower elements.

7. A connection for driving a reciprocable support comprising a reversible driving shaft, a gear driven by said shaft and loosely mounted to turn thereon, a cone-shaped friction member on said gear, a cooperating cone-shaped friction driving element keyed to turn with said shaft, an axially disposed compression spring seated in said driving element, and a cam element supported integrally with said gear arranged to act on said spring to move said driving element axially to maintain a frictional engaging pressure between said cone-shaped surfaces, said cam having a central low point and portions on each side thereof cammed upwardly at a sufficiently small slope to prevent relative movement between said friction members due to the force of the spring, the movement of the follower down one of said rise portions during relative movement of the gear and shaft being arranged to reduce the frictional pressure maintained by the spring, and the upward movement of the follower on the other of said rise portions being arranged to compress the spring and thereby to provide a steadily increasing frictional pressure between said friction surfaces to stop relative movement therebetween.

8. A connection for driving a reciprocable support comprising a driving shaft, a gear driven by said shaft and loosely mounted to turn thereon, a cone-shaped friction member on said gear, a cooperating cone-shaped friction driving element keyed to turn with said shaft, an axially disposed compression spring seated in said friction driving element, a cam follower ring engaged by said spring and keyed to turn with the driving element, a plurality of follower surfaces located at spaced intervals about said ring, a cam element supported integrally with said gear arranged for engagement with said follower and spring to move the driving element axially to maintain a frictional engaging pressure between said cone-shaped surfaces, said cam having a plurality of low points to engage said follower surfaces, and portions on each side of the low points cammed upwardly at a sufficiently small angle to prevent relative movement between said shaft and gear due to the force of the spring, and means for positively limiting relative movement of the gear and shaft in each direction to prevent movement of the follower surfaces beyond the ends of their cooperating rise portions.

9. A connection for driving a reciprocable support from a reversible driving member comprising driving and driven friction elements, means for positively limiting the extent of relative movement therebetween, said elements having opposed frictional engaging surfaces operative to resist relative movement of said elements in either direction for any relative movement thereof, means for maintaining an engaging pressure, and a device acting on said pressure means for varying the engaging pressure between said friction surfaces including a follower on one of said elements and a cam on the other of said elements, said cam having oppositely inclined rise portions cammed at a sufficiently small angle to prevent relative movement between said friction elements due to the engaging pressure between said cam and follower elements adapted upon relative movement of said elements toward either of said limiting positions to act upon the follower to provide an increasing frictional resistance sufficient to gradually stop relative movement of said elements within said positive limits.

10. A connection for driving a reciprocable support from the reversible driving member comprising driving and driven friction elements, means for positively limiting the extent of relative movement therebetween, said elements having opposed frictionally engaging surfaces operative to resist relative movement of said elements in either direction for any relative position thereof, means for maintaining an engaging pressure between said surfaces, and a cam and follower connection acting on said pressure means to vary the pressure exerted thereby comprising a follower on one of said elements and a cam on the other of said elements having a central low portion and a rise portion on each side thereof cammed at a sufficiently small angle to prevent relative movement between said frictional members due to the engaging pressure between said cam and follower elements, the movement of the follower down one of said rise portions during relative movement of said friction elements being arranged to reduce the pressure exerted by said pressure means and the upward movement of the follower on the other of said rise portions being arranged to increase said pressure to an extent sufficient to stop relative movement of said friction elements within said limits of relative movement.

11. A connection for driving a reciprocable support from a reversible driving member comprising driving and driven friction elements, means for positively limiting the extent of relative movement therebetween, said elements having opposed concentric frictionally engaging surfaces operative to resist relative movement of said elements in either direction for any relative position thereof, means for maintaining an engaging pressure between said surfaces comprising a spring and cam follower on one of said elements, a cam on the other of said elements cammed upwardly from each side of a central portion arranged as said elements approach either limit of relative movement to increase the engaging pressure between said frictional surfaces to increase the resistance to relative movement of said elements in either direction and to provide an additional element of resistance to continued movement of the elements due to the engagement of the spring-pressed follower against the inclined surface.

12. A connection for driving a reciprocable support from a reversible driving member comprising driving and driven friction elements, said elements having opposed frictionally engaging surfaces operative to resist relative movement of said elements in either direction for any relative position thereof, spring means for maintaining an engaging pressure between said surfaces, and a cam and follower connection acting on said spring means for varying the engaging pressure between said friction surfaces including a follower on one of said elements and a cam on the other of said elements, said cam having formed thereon a rise cammed at a sufficiently small angle to prevent relative movement of said elements due to the force of the spring and arranged upon relative movement of said elements to cooperate with said follower and spring means to provide a steadily increasing pressure between said friction surfaces to establish a stable driving relationship therebetween, said rise being of sufficient length to provide a continued increase of said pressure against further relative movement of said elements caused by abnormal load resistance through said connection.

13. A connection for driving a reciprocable support from a reversible driving member comprising driving and driven friction members supported to turn on a single axis and relatively movable between two limiting positions, said members having opposed frictionally engaging surfaces arranged to resist relative movement of said members in both directions, means for maintaining an engagement under pressure of said frictional surfaces, and a cam and follower connection acting on said pressure means to vary the pressure exerted thereby comprising a follower on one of said members and a cam on the other of said members having rise portions of sufficiently small slope to prevent relative movement between said frictional members due to the engaging pressure between said cam and follower elements, and arranged to be rendered operative by relative movement of said members toward either limiting position to act upon the follower to provide an increasing frictional pressure between said friction surfaces against further relative movement thereof.

14. A connection for driving a reciprocable support from a reversible driving member comprising driving and driven friction members supported to turn on a single axis and relatively movable between two limiting positions, said members having opposed frictionally engaging surfaces arranged to resist relative movement of said members in both directions, spring means for maintaining an engagement under pressure of said frictional surfaces, and a cam and follower connection acting on said spring means to vary the pressure exerted thereby comprising a follower on one of said members and a cam on the other of said members having rise portions cammed at a sufficiently small angle to prevent relative movement between said frictional members due to the engaging pressure between said cam and follower elements, and arranged to be rendered operative by relative movement of said members toward either limiting position to act upon the follower to provide a steadily increasing frictional pressure between said friction surfaces sufficient to stop relative movement therebetween within said limits of relative movement.

15. A connection for driving a reciprocable support from a reversible driving member comprising driving and driven friction elements supported to turn on a single axis, said members having opposed frictionally engaging surfaces arranged to resist relative movement of said elements in both directions, means for maintaining an engagement under pressure of said frictional surfaces, a cam and follower connection acting on said pressure means to vary the pressure exerted thereby comprising a follower on one of said elements and a cam on the other of said elements having a central low point and oppositely inclined rise portions of sufficiently small slope to prevent relative movement between said frictional members due to the engaging pressure between said cam and follower elements.

16. A connection for driving a reciprocable support from a reversible driving member comprising driving and driven friction elements supported to turn on a single axis, said members having opposed frictionally engaging surfaces arranged to resist relative movement of said elements in both directions, means for positively limiting the extent of relative movement therebetween, means for maintaining an engagement under pressure of said frictional surfaces, a cam and follower connection acting on said pressure means to vary the pressure exerted thereby comprising a follower on one of said elements and a cam on the other of said elements having a central low point and oppositely inclined rise portions of sufficiently small slope to prevent relative movement between said frictional members due to the engaging pressure between said cam and follower elements.

17. A connection for driving a reciprocable support from a reversible driving member comprising driving and driven friction elements supported to turn on a single axis and arranged to have a limited relative rotary movement, said elements having opposed friction surfaces concentric with said axis, pressure means acting on said elements in a direction substantially normal to the direction of movement of said surfaces to maintain a frictional engaging pressure between said surfaces to resist relative movement of said elements in either direction in all relative positions of said elements, and means including a cam and follower connection acting to vary the frictional pressure exerted by said pressure means in accordance with the relative angular position of said elements, to exert a relatively small pressure for an intermediate position of said elements and a steadily increasing pressure as said elements are moved relatively toward either limiting position, said cam having a sufficiently small angle of rise to prevent relative movement between said friction elements due to the engaging pressure between said follower and cam.

MAXWELL I. MATHEWSON.

CERTIFICATE OF CORRECTION.

Patent No. 2,146,153.   February 7, 1939.

MAXWELL I. MATHEWSON.

It is hereby certified that error appears in the printed specification of the above numbered patent requiring correction as follows: Page 5, second column, line 49, claim 9, after the word "pressure" and before the comma, insert between said surfaces; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.